United States Patent
Hommen et al.

(10) Patent No.: US 7,185,592 B2
(45) Date of Patent: Mar. 6, 2007

(54) SYSTEM FOR THE SECONDARY SUSPENSION OF A SUPERSTRUCTURE OF A RAIL VEHICLE HAVING A PASSIVE SPRING ELEMENT

(75) Inventors: Winfried Hommen, Ebersberg (DE); Henry Kirsch, München (DE); Martin Lehmair, München (DE); Reinhard Loebner, München (DE); Martin Waldstein, München (DE); Ralf Oberthür, München (DE)

(73) Assignee: Knorr-Bremse Systeme fur Schienenfahrzeuge GmbH, Munich (DE)

(*) Notice: Subject to any disclaimer, the term of this patent is extended or adjusted under 35 U.S.C. 154(b) by 0 days.

(21) Appl. No.: 11/015,800

(22) Filed: Dec. 20, 2004

(65) Prior Publication Data

US 2005/0183624 A1   Aug. 25, 2005

(30) Foreign Application Priority Data

Dec. 22, 2003   (DE) ................ 103 60 518

(51) Int. Cl.
*B61F 1/00* (2006.01)
(52) U.S. Cl. .................................... 105/453
(58) Field of Classification Search ............ 105/453, 105/199.1, 199.2, 199.3
See application file for complete search history.

(56) References Cited

U.S. PATENT DOCUMENTS

| | | | |
|---|---|---|---|
| 2,917,321 A | 12/1959 | Fennell | |
| 3,396,674 A | 8/1968 | Tani | |
| 3,491,702 A | 1/1970 | Dean | |
| 3,524,657 A | 8/1970 | Yew et al. | |
| 4,097,063 A | 6/1978 | Dean | |
| 4,368,672 A | 1/1983 | Germer | |
| 4,428,302 A | 1/1984 | Herring, Jr. | |
| 4,468,050 A | 8/1984 | Woods et al. | |
| 5,193,849 A | 3/1993 | Holzmann | |
| 5,443,282 A | 8/1995 | Gipser | |
| 5,573,266 A | 11/1996 | Zalewski et al. | |
| 5,588,368 A | 12/1996 | Richter et al. | |
| 5,671,682 A | 9/1997 | Hölzl et al. | |
| 5,700,026 A | 12/1997 | Zalewski et al. | |
| 5,769,400 A | 6/1998 | Hölzl et al. | |
| 5,947,031 A | 9/1999 | Polley | |
| 5,988,655 A | 11/1999 | Sakai et al. | |
| 6,098,995 A | 8/2000 | Danis | |
| 6,102,378 A | 8/2000 | Gieseler et al. | |
| 6,249,728 B1 | 6/2001 | Streiter | |

(Continued)

FOREIGN PATENT DOCUMENTS

AT                373 847            7/1983

(Continued)

*Primary Examiner*—S. Joseph Morano
*Assistant Examiner*—Robert J. McCarry, Jr.
(74) *Attorney, Agent, or Firm*—Barnes & Thornburg LLP

(57) ABSTRACT

A secondary suspension for a rail vehicle includes a superstructure, a bogie and a steel spring arranged between the superstructure and the bogie. The steel spring ensures at least one raised traveling level for the superstructure when the rail vehicle is traveling. Further included is a tension cylinder. When the rail vehicle is stopped, the steel spring is compressed by the tension cylinder to adjust the superstructure to a lowered station platform level below the at least one traveling level.

12 Claims, 1 Drawing Sheet

U.S. PATENT DOCUMENTS

| | | |
|---|---|---|
| 6,273,002 B1 | 8/2001 | Hachmann et al. |
| 6,550,394 B1 * | 4/2003 | Polley ........................ 105/164 |
| 6,623,016 B2 * | 9/2003 | Sulzyc et al. ............ 280/5.514 |
| 6,637,348 B1 * | 10/2003 | Teichmann et al. ......... 105/453 |
| 6,684,139 B1 | 1/2004 | Kirat et al. |
| 2002/0096840 A1 | 7/2002 | Sulzyc et al. |
| 2004/0016361 A1 | 1/2004 | Teichmann et al. |

FOREIGN PATENT DOCUMENTS

| | | |
|---|---|---|
| DE | 1 947 680 | 1/1971 |
| DE | 27 23 305 | 12/1978 |
| DE | 38 34 693 A1 | 6/1989 |
| DE | 40 13 673 A1 | 10/1991 |
| DE | 195 15 255 A1 | 10/1996 |
| EP | 0 663 877 B1 | 7/1995 |
| EP | 0 690 802 B1 | 1/1996 |
| FR | 2 436 682 | 9/1978 |
| WO | WO 94/03340 A1 | 2/1994 |

* cited by examiner

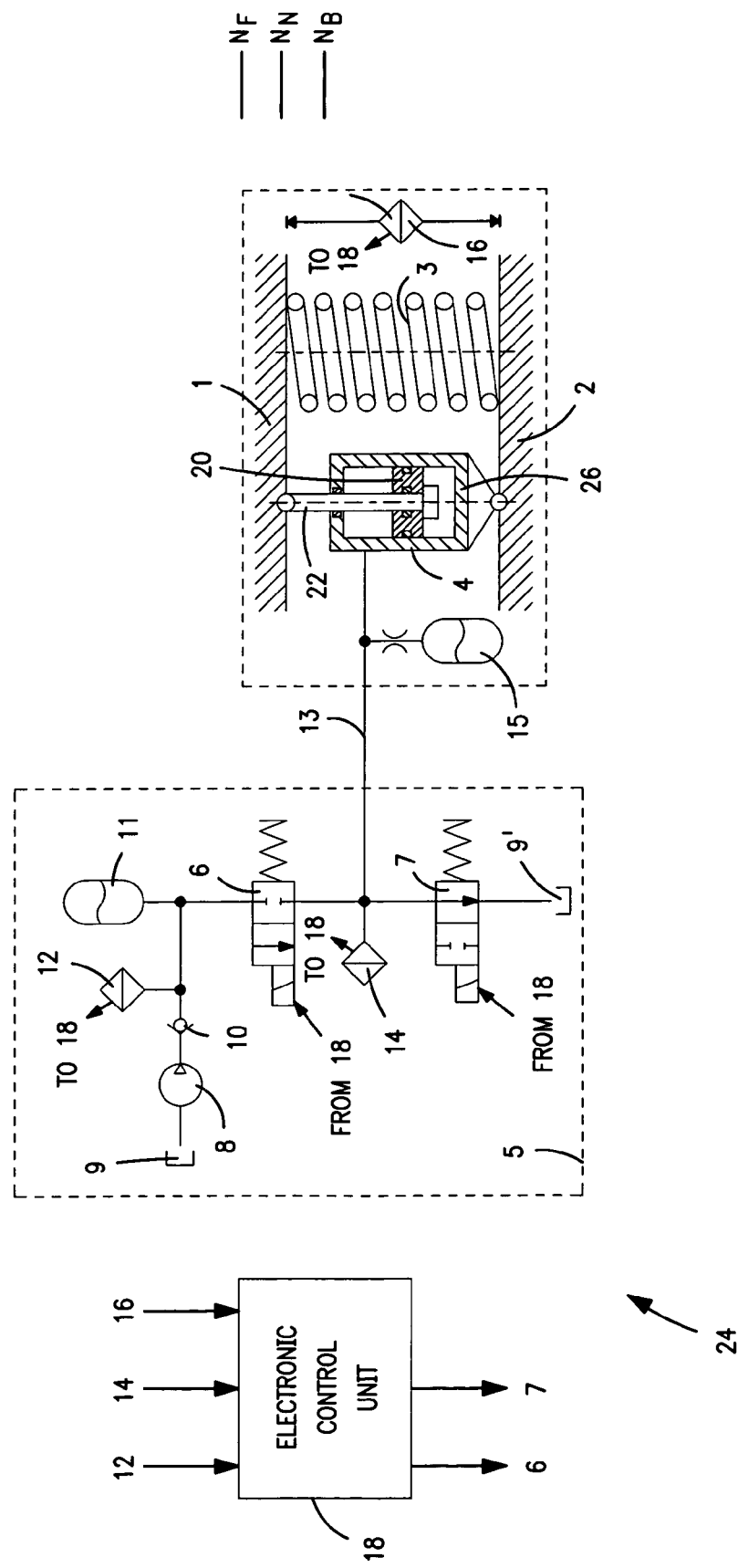

SYSTEM FOR THE SECONDARY SUSPENSION OF A SUPERSTRUCTURE OF A RAIL VEHICLE HAVING A PASSIVE SPRING ELEMENT

BACKGROUND AND SUMMARY

The present disclosure relates to a system for the secondary suspension of a superstructure of a rail vehicle. The system includes a steel spring as a passive spring element arranged between the superstructure and a bogie. The steel spring ensures as least one raised traveling level $N_F$ for the superstructure when the rail vehicle is traveling.

A secondary suspension between a superstructure and a railborne bogie of a rail vehicle is used particularly for the additional vibration isolation of the superstructure in order to permit a comfortable travel when conveying passengers. In many cases, the secondary suspension also interacts with a roll control for the superstructure. In addition to the secondary suspension used for the increase of comfort, a rail vehicle of the type of interest here also has a primary suspension. The primary suspension acts between the wheel axles of the rail vehicle and the bogie and is used predominantly for absorbing hard shocks to which the rail vehicle is subjected during its travel as a result of an uneven rail guidance and the like.

It is generally known to use conventional steel springs for the secondary suspension in addition to a pneumatic suspension or hydropneumatic suspension. The superstructure is normally cushioned with respect to the bogie by way of two such passive spring elements, in which case the bogie normally carries a pair of wheel axles which establish the contact with the rail.

However, when a secondary suspension is constructed by steel springs as passive spring elements, the problem arises that the superstructure level may change as a function of the loading. As used in the present disclosure, the superstructure level is the vertical level of the superstructure relative to the bogie or to the ground.

From European Patent Document EP 0 663 877 B1, a system for the secondary suspension is known which avoids the above-noted problem in that no steel springs are used for the secondary suspension. On the contrary, the secondary suspension is implemented by a hydropneumatic spring unit. The hydropneumatic spring unit consists of a spring leg and of a hydropneumatic pressure accumulator. These assemblies carry out the function of cushioning the superstructure as well as the function of damping the spring excursions. The spring leg is fastened on the superstructure and on the bogie. During a spring excursion, the piston in the spring leg displaces a defined oil volume. In the hydropneumatic pressure accumulator connected with the spring leg, this oil volume acts against a gas cushion which is separated from the oil volume by a membrane and is therefore used as a springy element. The hydraulic fluid, as the liquid column, therefore takes over the function of the power transmission. Vehicle vibrations during the travel are damped by the nozzles housed in a nozzle block. As the load of the superstructure increases, the gas volume in the hydropneumatic accumulators is compressed. Without any level control system, this would result in a lowering of the superstructure, as in the case of the above-described passive spring element. However, in order to avoid this lowering, the reduction of the gas volume has to be compensated by feeding a corresponding amount of hydraulic fluid. For this purpose, the level control system is provided which carries out this compensation as a function of the distance between the superstructure and the bogie measured by a level sensor. The controlling of level changes takes place continuously and with little time delay while the vehicle is stopped. During the travel, the mean vehicle level is also continuously monitored and compensated.

In certain application cases, it is defined that, in addition to a raised traveling level $N_F$, the superstructure also has to take up a station platform level $N_B$ which is below it and which, in a lowered position of the superstructure matches the door steps of the rail vehicles with the height of the station platform, so that an entering and exiting becomes possible without steps. Furthermore, safety-related regulations require that, despite such a lowered station platform level $N_B$, in the case of a system failure, the superstructure of the rail vehicle can also independently take up a so-called emergency level $N_N$ situated slightly above it. This emergency level $N_N$ situated between the lowered station platform level $N_B$ and the raised traveling level $N_F$, despite the system failure, permits an at least slow continued traveling of the rail vehicle.

In the case of the known system for the secondary suspension with an active level control, however, an emergency level $N_N$ starting from a traveling level $N_F$ can only be adjusted if sufficient stored pressure is present in the supply reservoir and the assigned valve is operated manually. Thus, an emergency level $N_N$ cannot be ensured under all conditions.

Furthermore, the known system for the secondary suspension has a fairly high-cost construction, which applies particularly to the construction of the spring leg constructed in the manner of a lifting cylinder.

The present disclosure provides for a system for the secondary suspension by which, despite a system failure, the superstructure can take up an emergency level $N_N$ from a lowered station platform level $N_B$ under any condition.

Thus, according to the present disclosure, a secondary suspension system for a rail vehicle includes a superstructure, a bogie, and a steel spring arranged between the superstructure and the bogie. The steel spring ensures at least one raised traveling level for the superstructure when the rail vehicle is traveling. Also included is a tension cylinder. When the rail vehicle is stopped, the steel spring is compressed by the tension cylinder to adjust he superstructure to a lowered station platform level below the at least one traveling level.

The present disclosure includes the technical teaching that a steel spring as a passive spring element of a secondary suspension can be compressed, when the rail vehicle is stopped, by the tension cylinder in order to adjust to the lowered station platform level for the superstructure situated below the traveling level $N_F$. In is such an embodiment, the passive spring element is connected in parallel to the tension cylinder.

According to the present disclosure, in the event of a system failure, the tension cylinder is automatically depressurized so that the parallel steel spring rebounds. During a stoppage, that is, in the area of the station stop, this has the effect that, from the lowered station platform level $N_B$, the superstructure arrives at a higher level, which here corresponds to the traveling level $N_F$, so that a continued traveling of the rail vehicle becomes possible. Also, according to the present disclosure, simple construction elements are employed, such as a conventional steel spring as well as a hydraulic cylinder available as a standardized component.

The tension cylinder should preferably be arranged locally next to the steel spring while acting between the superstructure and the bogie. This arrangement ensures a good access to the tension cylinder as well as to the steel spring from the outside for servicing or repair. As an alternative, it is also conceivable to arrange the tension cylinder inside the steel spring, constructed as a coil spring, and acting between the superstructure and the bogie. In comparison to the former arrangement, this provides a space-saving housing which should be selected when required by a narrow installation situation.

Since the tension cylinder has to follow not only vertical but also transverse and longitudinal movements of the superstructure relative to the bogie, it should be equipped with a ball joint on the bogie side and the superstructure side, whereby the coupling takes place. The ball joint can be constructed either as a conventional ball joint or, in a space-saving manner, as a ball socket, in which case the pivot can be selected as a function of the diameter of the ball socket.

According to the present disclosure, a level sensor is provided for measuring the distance between the superstructure and the bogie, which level sensor, as an actual-value generator, is a component of an active level control for adjusting a desired superstructure level. Thus, the traveling level $N_F$, as well as station platform level $N_B$ can be precisely adjusted by an electronic defining of desired values. A linear distance sensor is, for example, suitable for use as the level sensor. A space-saving arrangement is obtained when the level sensor is integrated directly in the tension cylinder.

As an alternative to this level control, it is also conceivable to achieve a level adjustment of the tension cylinder in that the latter can be moved against a final stop in order to reach the lowered station platform level $N_B$. However, care should be taken that the hydraulic system of the secondary suspension is dimensioned such that a stored pressure exists which is sufficient for a complete lowering of the superstructure by the tension cylinder.

A hydraulic unit can be used for admitting pressure to the tension cylinder. The working line of the hydraulic unit leading to the tension cylinder can alternatively be acted upon either by a filling valve connected with a pressure source or can be relieved by a relief valve connected with a tank. The filling valve and the relief valve, being components of a level control, can be alternately controllable by an electronic control unit. In the case of an active level control, the filling valve or valves and the relief valve form actuators of a control circuit.

In order to prevent a taking-in of hydraulic oil from the tank during a deflection of the steel spring as a result of vibrating movements during the travel, the tension cylinder has a piston which takes along a piston rod originating therefrom only in the moving-in direction, whereas, in the moving-out direction, the piston is uncoupled therefrom. By this simple mechanical uncoupling, a disturbing suction intake is avoided.

As an alternative, it is also conceivable to connect a hydraulic accumulator to the working line leading to the tension cylinder. This hydraulic accumulator inserted to this extent into the level circuit permits a regulating of the level also during the travel. During a rebounding, the hydraulic accumulator will then receive hydraulic oil displaced from the tension cylinder. The filling valve and the relief valve of the hydraulic unit can remain closed during the travel. The above-mentioned hydraulic accumulator may be-constructed in the manner of a membrane accumulator.

Other aspects of the present disclosure will become apparent from the following descriptions when considered in conjunction with the accompanying drawings.

BRIEF DESCRIPTION OF THE DRAWINGS

The FIGURE is a schematic view of a system for the secondary suspension of a superstructure using a passive spring element, according to the present disclosure.

DETAILED DESCRIPTION

According to the FIGURE, a steel spring 3 is arranged as a passive spring element, between an upper superstructure 1 of a rail vehicle (not shown in detail) and a lower bogie 2. During travel of the rail vehicle, the steel spring 3 ensures at least one traveling level, shown as a raised traveling level $N_F$ for the superstructure 1, so that the superstructure 1 remains unaffected by disturbing vibrations caused by the travel. The steel spring 3 simultaneously takes over the transverse suspension of the superstructure 1. A tension cylinder 4 is connected in parallel to the steel spring 3. To this extent, the tension cylinder 4 also acts between the upper superstructure 1 and the lower bogie 2 and is linked to both. The tension cylinder 4 is used for a compression of the adjacent steel spring 3, so that the superstructure 1 can be changed from its normal traveling level $N_F$ to a lowered station platform level $N_B$. At this lower station platform level $N_B$, door steps of entrance doors of the superstructure 1 are coordinated with the station platform (not shown), with respect to the height, so that an unhindered entering and exiting becomes possible.

To achieve the lowered station platform level $N_B$, pressure is admitted to the tension cylinder 4 by a hydraulic unit 5. The hydraulic unit 5 comprises a filling valve 6 as well as a relief valve 7 which can alternately be controlled by an electronic control unit 18. In this embodiment, the filling valve 6 as well as the relief valve 7 are constructed as a spring-restored monostable 2/2-way valve. As an alternative, it is also conceivable to achieve a level adjustment of the tension cylinder 4 by moving the tension cylinder 4 against a final stop 26 in order to reach the lowered station platform level $N_B$. The tension cylinder 4 may thus be used for a passive level adjustment.

On a feeding-pressure side, the filling valve 6 is connected with a first pressure source in the form of a hydraulic pump 8. The hydraulic pump 8 delivers hydraulic fluid from a first tank 9 via a non-return valve 10 to the filling valve 6 and simultaneously to a first hydropneumatic accumulator 11. Furthermore, a first pressure sensor 12 is provided for monitoring the feeding pressure. By way of the filling valve 6, the feeding pressure arrives in a working line 13 leading to the tension cylinder 4 in order to act upon the tension cylinder 4 so that the superstructure 1 is moved from the traveling level $N_F$ to the station platform level $N_B$.

A return movement from the station platform level $N_B$ to the normal traveling level $N_F$ takes place by an opening of the relief valve 7 so that, triggered by the effect of the force of the steel spring 3, the hydraulic fluid escapes from the tension cylinder 4 and, by the working line 13 and the opened relief valve 7, returns into second tank 9'. Another pressure sensor 14 is used for monitoring working pressure existing in the working line 13. In addition, a second hydropneumatic accumulator 15 is connected into working line 13. The hydropneumatic accumulator 15 permits a controlling of the height level of the superstructure 1 during the travel.

The active controlling of the superstructure level is permitted by a level sensor 16. As an actual value generator, level sensor 16 measures a distance between the superstructure 1 and the bogie 3 and transmits the measured value to the electronic control unit 18. The level sensor 16 may be constructed as a linear distance sensor. Hydraulic unit 5 and electronic control unit 18 comprise, for example, a level control 24, which becomes an active level control when level sensor 16 is included as part of the level control 24.

If the pressure supply or the electronic control unit 18 fails in the event of a disturbance, the hydraulic unit 5 is deenergized. The tank-side relief valve 7 takes up its normally-open switching position and establishes a connection to the second tank 9', so that the tension cylinder 4 is depressurized. As a result, the steel spring 3 rebounds, so that the superstructure 1 moves from the station platform level $N_B$ to the traveling level $N_F$, which may simultaneously be the emergency level $N_N$.

In order to prevent a taking-in of hydraulic oil from the second tank 9' during a deflection of the steel spring 3 as a result of vibrating movements during travel, tension cylinder 4 includes a piston 20 which takes along a piston rod 22 only during a moving-in direction. However, in a moving-out direction, the piston 20 is decoupled from the piston rod 22. Thus, a suction intake may be avoided.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A secondary suspension system for a rail vehicle comprising
    a superstructure;
    a bogie;
    a steel spring arranged between the superstructure and the bogie, the steel spring ensuring at least one raised traveling level for the superstructure when the rail vehicle is traveling;
    a tension cylinder;
    a hydraulic unit, including a filling valve and a relief valve;
    a working line arranged between the tension cylinder and the hydraulic unit;
    wherein, when the rail vehicle is traveling, the steel spring is configured to be decompressed by ventilating the tension cylinder by opening the relief valve to adjust the superstructure to the at least one traveling level; and
    when the rail vehicle is stopped, the steel spring is configured to be compressed by pressurizing the tension cylinder by opening the filling valve to adjust the superstructure to a lowered station platform level below the at least one traveling level.

2. The system according to claim 1, wherein the tension cylinder is arranged locally next to the steel spring and acts between the superstructure and the bogie.

3. The system according to claim 1, wherein the tension cylinder is arranged inside the steel spring, the steel spring constructed as a coil spring and acting between the superstructure and the bogie.

4. The system according to claim 1, further including a level sensor to measure a distance between the superstructure and the bogie, which level sensor is a component of an active level control for adjusting a desired superstructure level.

5. The system according to claim 4, wherein the level sensor is constructed as a linear distance sensor.

6. The system according to claim 4, wherein the level sensor is an actual value generator.

7. The system according to claim 1, further including a level sensor constructionally integrated in the tension cylinder.

8. The system according to claim 1, wherein the tension cylinder, when used as a passive level adjustment, is moved against a final stop in order to reach the lowered station platform level.

9. The system according to claim 1, the filling valve and the relief valve being alternately controllable by an electronic control unit.

10. The system according to claim 1, wherein the tension cylinder includes a piston having a piston rod originating from the piston, the piston rod being movable relative to the piston during a deflection of the steel spring.

11. The system according to claim 1, wherein the steel spring is a passive spring element.

12. A secondary suspension system for a rail vehicle comprising
    a superstructure;
    a bogie;
    a steel spring arranged between the superstructure and the bogie, the steel spring ensuring at least one raised traveling level for the superstructure when the rail vehicle is traveling;
    a tension cylinder;
    when the rail vehicle is stopped, the steel spring is compressed by the tension cylinder to adjust the superstructure to a lowered station platform level below the at least one traveling level; and
    wherein to control the superstructure level during travel of the rail vehicle, a fluid accumulator is connected to a working line leading to the tension cylinder.

* * * * *